O. RASH & F. HAWES.
TRANSMISSION MECHANISM.
APPLICATION FILED JUNE 17, 1911.
1,007,890.
Patented Nov. 7, 1911.
2 SHEETS—SHEET 1.
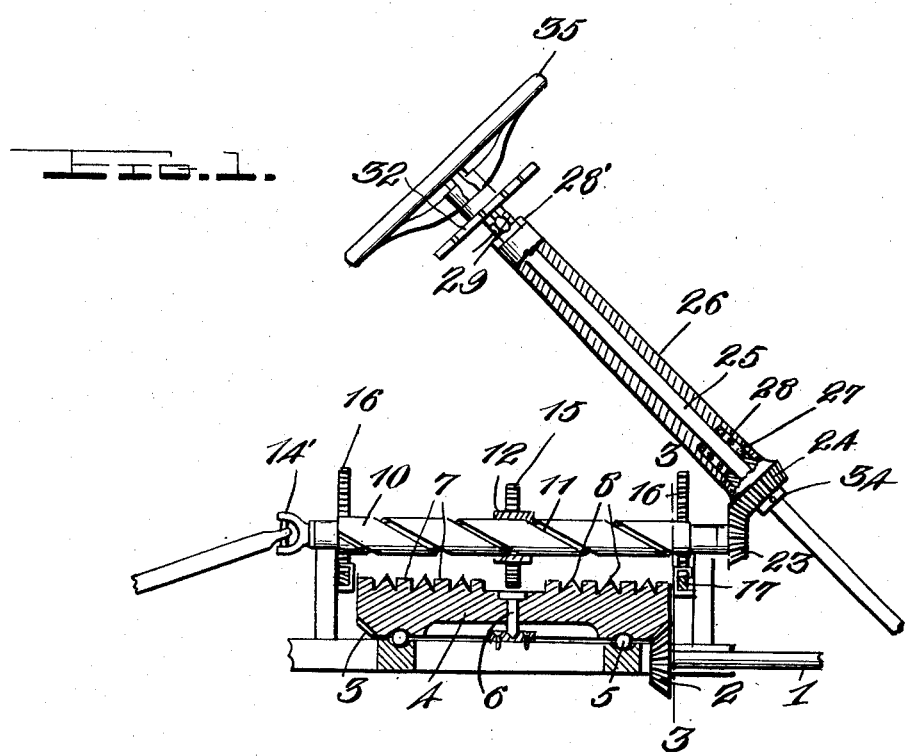
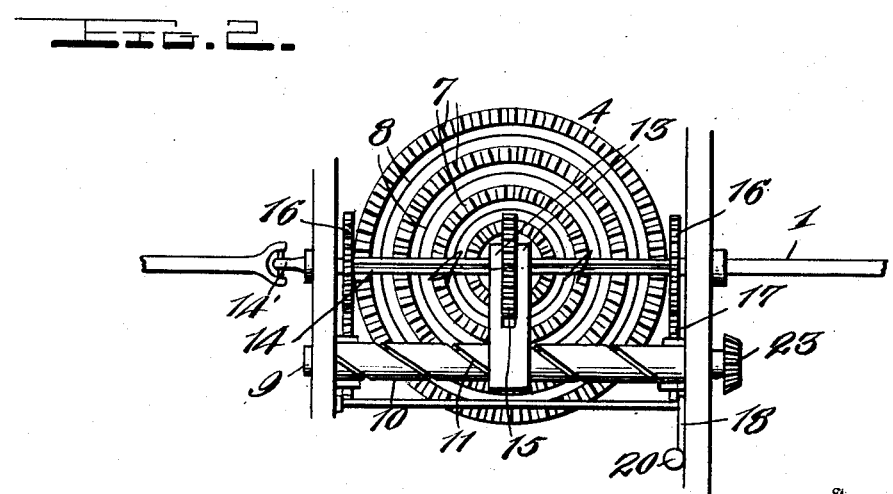
Witnesses
Chas. L. Griestauer.
H. E. Coleman,
Inventors
O. Rash and
F. Hawes,
By Watson E. Coleman.
Attorney

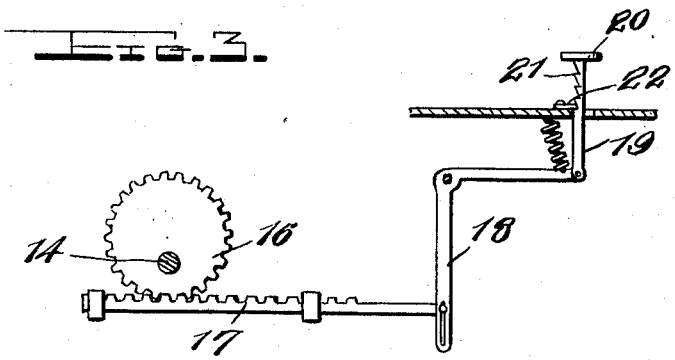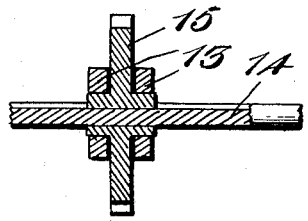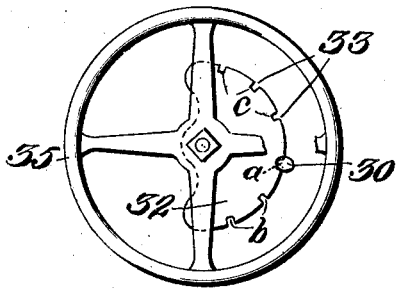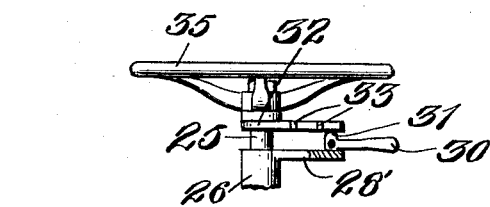

UNITED STATES PATENT OFFICE.

OSCAR RASH AND FRANKLIN HAWES, OF OAKLAND, CALIFORNIA.

TRANSMISSION MECHANISM.

1,007,890.         Specification of Letters Patent.         Patented Nov. 7, 1911.

Application filed June 17, 1911. Serial No. 633,673.

*To all whom it may concern:*

Be it known that we, OSCAR RASH and FRANKLIN HAWES, citizens of the United States, residing at Oakland, in the county of Alameda and State of California, have invented certain new and useful Improvements in Transmission Mechanism, of which the following is a specification, reference being had to the accompanying drawings.

This invention relates to new and useful improvements in transmission mechanism and has for its object to provide means for controlling the speed of a vehicle from the steering gear with the assistance of one foot lever, thereby dispensing with the levers ordinarily used at the side of the vehicle.

Another object is to provide improved gearing by which the speed of a driven shaft can be varied in definite steps with a constant speed of the driving shaft.

Another object of the invention is to provide a device of this character which will possess advantages in points of efficiency, durability, is inexpensive of manufacture and at the same time being simple in construction and operation.

With the above and other objects in view, the invention consists of the novel features of construction, combination and arrangement of parts hereinafter fully described and claimed, and illustrated in the accompanying drawings, in which—

Figure 1 is a side elevation partly broken away and in section; Fig. 2 is a top plan view; Fig. 3 is a section on the line 3—3 of Fig. 1; Fig. 4 is a section on the line 4—4 of Fig. 2. Fig. 5 is a top plan view of the steering wheel; and Fig. 6 is a side elevation of the same partly in section.

Referring more particularly to the drawings 1 indicates the engine shaft, having a gear wheel 2 mounted on one end thereof and adapted to mesh with the cogs 3 on the lower outer edge of the disk 4. The disk 4 is rotatably mounted upon the ball bearings 5 and has a centrally arranged pivot or bearing 6. The upper face of the disk 4 is provided with a series of spaced concentric annular racks 7 and the annular spacing ribs 8. Mounted in suitable bearings and disposed above said disk is a shaft 9 having a sleeve 10 mounted thereon and provided with a spiral groove 11. A spiral nut 12 is mounted on the sleeve 10, having the arms 13 formed integral therewith and pivotally mounted on the shaft 14, said shaft being mounted in suitable bearings and centrally disposed above the disk 4. Formed on the outer end of this shaft is a yoke 14' which is universally connected to the drive shaft. A gear wheel 15 is mounted on the shaft 14 and disposed between the arms 13 and adapted to mesh with the annular racks 7. This gear 15 is thrown into and out of mesh with the racks 7 by means of the eccentric gears 16 mounted on the shaft 14 and operated by the sliding racks 17, the right hand rack being pivotally secured to one end of a bell crank lever 18 and the other end of said lever being pivotally secured to a vertically disposed rod 19 having a foot piece 20 on the upper end thereof, said rod having the notches 21 formed therein adapted to engage the lip 22 secured to the bottom of the vehicle.

Mounted on one end of the shaft 9 is a bevel gear 23, adapted to mesh with a similar gear 24 rotatably mounted on the steering shaft 25, said gear being keyed to the lower end of the sleeve 26, which is rotatably mounted upon the shaft 25 and provided with an annular recess 27 adapted to receive the spring 28 which encircles the shaft 25 and is adapted to hold the gear 24 in engagement with the gear 23. Formed upon the upper end of the sleeve 26 is an arm 28' having the vertically disposed lugs 29 formed integral therewith. Pivotally mounted between the lugs 29 is the small hand lever 30 having a cam 31 formed upon one end thereof and adapted to engage the lower side of a ratchet plate 32 which is mounted on the shaft 25 and provided with the notches 33, said notches comprising a neutral *a*, two reverse *b* and three speed notches *c*. A collar 34 is secured to the shaft 25 and disposed beneath the gear 24 to limit the downward movement of the same and a steering wheel 35 is secured to the upper end of said shaft. In starting the machine, the gear is raised to a desired height by pressure of the foot upon the rod 19, the hand lever 30 being then thrown from the neutral notch to a horizontal position which in turn forces the gear 24 securely into mesh with the gear 23. The lever is then turned either to the left or right according to the direction in which the machine is going. If forward, the lever is turned to first speed notch which in turn will rotate the sleeve 10 and throw the gear 15 over onto the first of the racks 7, the foot lever being then released, and the gear will mesh with the rack and convey motion through the shaft 14 to the drive wheels.

While we have shown and described the preferred construction of our invention, it will be obvious that various changes in the details of construction and in the proportions may be resorted to for successfully carrying our invention into practice without sacrificing any of the novel features or departing from the scope thereof.

Having thus described the invention what is claimed is:—

1. Transmission mechanism comprising a rotatable disk, having concentric annular racks formed integral therewith, a drive shaft, a gear wheel mounted thereon and adapted to mesh with said racks, a shaft disposed above and to one side of said disk, a spiral sleeve mounted on said shaft, means carried by said sleeve to shift said gear wheel to any one of the racks, means for raising the drive shaft to a desired height, and means for rotating the spiral sleeve to shift said gear.

2. Transmission mechanism comprising a rotatable disk, having concentric annular racks formed integral therewith, a drive shaft, a gear wheel mounted thereon and adapted to mesh with said racks, eccentric gears mounted on said shaft, racks slidably mounted and operating said gears, a bell crank lever pivoted to said rack, a foot lever connected to said bell crank lever for raising the first mentioned gear to a desired height, and means for shifting said gear to mesh with any one of the racks of the disk.

3. Transmission mechanism comprising a rotatable disk having concentric annular racks formed thereon, a drive shaft, a gear wheel mounted thereon and adapted to mesh with said racks, a second shaft mounted in suitable bearings and disposed above and to one side of said disk, a spiral sleeve mounted on said shaft, a spiral nut mounted on said sleeve having arms formed integral therewith and disposed on both sides of said gear wheel, a bevel gear mounted on one end of the second shaft, a similar gear adapted to mesh with said bevel gear, means for rotating said gears to shift the first mentioned gear to any one of the racks on the disk, and means for raising said gear wheel to a desired height prior to shifting the same.

4. Transmission mechanism comprising a rotatable disk having concentric annular racks formed thereon, a drive shaft, a gear wheel mounted on said shaft and adapted to mesh with said racks, a second shaft, a spiral sleeve mounted on said shaft, said gear being mounted on said sleeve, a bevel gear mounted on the second shaft, an angularly disposed shaft, a bevel gear rotatably mounted thereon adapted to mesh with the first mentioned bevel gear, a sleeve mounted on said angularly disposed shaft on which the second gear is keyed, an arm formed integral with said sleeve, a hand lever pivotally mounted on said arm, a ratchet plate mounted on said steering shaft and provided with notches adapted to receive said hand lever when disposed in a vertical plane, and means for raising and lowering the first mentioned gear wheel to shift the same into mesh with any one of the racks on the disk.

In testimony whereof we hereunto affix our signatures in the presence of two witnesses.

OSCAR RASH.
FRANKLIN HAWES.

Witnesses:
FLORENCE LITTLE,
G. L. WARNKEN.

Copies of this patent may be obtained for five cents each, by addressing the "Commissioner of Patents, Washington, D. C."